US011269420B1

(12) United States Patent
Marti et al.

(10) Patent No.: US 11,269,420 B1
(45) Date of Patent: Mar. 8, 2022

(54) TECHNIQUES FOR DETECTING ACKNOWLEDGMENT FROM A DRIVER OF A VEHICLE

(71) Applicant: HARMAN INTERNATIONAL INDUSTRIES, INCORPORATED, Stamford, CT (US)

(72) Inventors: Stefan Marti, Oakland, CA (US); Priya Seshadri, San Francisco, CA (US); Joseph Verbeke, San Francisco, CA (US); Evgeny Burmistrov, Saratoga, CA (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 17/090,790

(22) Filed: Nov. 5, 2020

(51) Int. Cl.
G06F 3/01 (2006.01)
G06K 9/00 (2006.01)
B60Q 9/00 (2006.01)
G08G 1/16 (2006.01)

(52) U.S. Cl.
CPC ............ G06F 3/017 (2013.01); B60Q 9/00 (2013.01); G06F 3/013 (2013.01); G06K 9/00805 (2013.01); G06K 9/00845 (2013.01); G08G 1/166 (2013.01)

(58) Field of Classification Search
None
See application file for complete search history.

(56) References Cited

U.S. PATENT DOCUMENTS

| 2009/0243880 | A1* | 10/2009 | Kiuchi | G08G 1/166 340/903 |
| 2015/0193664 | A1* | 7/2015 | Marti | A61B 5/18 382/103 |
| 2017/0186318 | A1* | 6/2017 | Murayama | G08G 1/16 |
| 2018/0012085 | A1* | 1/2018 | Blayvas | H04N 13/20 |

OTHER PUBLICATIONS

U.S. patent application entitled, "Techniques for Generating Vehicle-To-Pedestrian (V2P) Communications Based On Driver Monitoring", U.S. Appl. No. 17/066,431, filed Oct. 2020, 37 pages.
U.S. patent application entitled, "Context Aware Safety Alerts", U.S. Appl. No. 16/993,155, filed Aug. 13, 2020, 41 pages.

* cited by examiner

Primary Examiner — Thomas S McCormack
(74) Attorney, Agent, or Firm — Artegis Law Group, LLP

(57) ABSTRACT

Disclosed embodiments include techniques for detecting an acknowledgement from a driver of a vehicle. A driver state and reaction tracking system determines that a detected condition exceeds a threshold hazard potential with the vehicle. The driver state and reaction tracking system detects a gesture, by a driver, associated with the detected condition. The driver state and reaction tracking system, in response to detecting the gesture, reduces an urgency level for alerting the driver of the detected condition to generate a reduced urgency level. The driver state and reaction tracking system determines whether to issue an alert to the driver based on the reduced urgency level. The driver state and reaction tracking system may transmit an acknowledgement to other systems associated with pedestrians, bicyclists, motorcyclists, semiautonomous vehicles, manually driven vehicles and/or the like. to confirm that the driver has seen the pedestrian, bicyclist, motorcyclist, or vehicle associated with the other system.

20 Claims, 7 Drawing Sheets

TECHNIQUES FOR DETECTING ACKNOWLEDGMENT FROM A DREVER OF A VEHICLE

BACKGROUND

Field of the Embodiments of the Present Disclosure

Embodiments of the present disclosure relate generally to driver monitoring systems and, more specifically, to techniques for detecting acknowledgments from a driver of a vehicle.

Description of the Related Art

Many modern vehicles are equipped with an advanced driver-assistance system (ADAS) with externally facing sensors for detecting objects in the external environment surrounding the vehicle. Upon detecting such objects, and knowing the speed and direction of travel of the vehicle, the ADAS determines whether the driver is about to perform a dangerous operation, such as colliding with an object, driving through a stoplight, and/or the like. Many modern vehicles further include a driver monitoring system (DMS) that determines a general awareness of the driver by determining the eye gaze direction of the driver, the fatigue level of the driver, the cognitive load of the driver, and/or the like. If the ADAS determines that the driver is about to perform a dangerous operation (e.g., failing to brake for a slowing vehicle ahead, starting to leave the current lane without signaling, and/or the like), and if the driver is looking in the wrong direction, is fatigued, or has significant cognitive load, then the DMS transmits a warning to the driver. The warning could be an audible alarm, a haptic output, a visual display, and/or the like. Upon receiving the warning, the driver is able take any needed corrective actions, such as applying the brakes, turning the steering wheel, sounding the vehicle horn, and/or the like.

One potential drawback with the above approach is that the DMS may make an incorrect determination regarding the state of the driver. In one example, the DMS may determine that the eye gaze direction of the driver is towards an object on a collision path, the driver is not fatigued, and the driver has a low cognitive load. Nevertheless, the driver may not be consciously aware of the danger of colliding with the object. Therefore, the DMS may determine to not transmit a warning to the driver, even though the driver has a low awareness of the danger of collision. As a result, the vehicle may collide with the object. In another example, the DMS may determine that the eye gaze direction of the driver is away from an object on a collision path, the driver is fatigued, and the driver has a high cognitive load. Nevertheless, the driver may have earlier detected the danger of colliding with the object. Therefore, the DMS may determine to transmit a warning to the driver, even though the driver has a high awareness of the danger of collision. As a result, the driver receives an unneeded warning. In this latter example, if the driver continues to receive unneeded warnings, the unneeded warnings may increase the cognitive load on the driver, leading to an increased potential for distracted driving. In addition, the driver may start to ignore the warnings received from the DMS or disable the DMS warning system altogether, thereby defeating a key purpose of the DMS.

As the foregoing illustrates, improved techniques for generating warnings to a driver of a vehicle would be useful.

SUMMARY

Various embodiments of the present disclosure set forth a computer-implemented method for detecting an acknowledgement from a driver of a vehicle. The method includes determining that a detected condition exceeds a threshold hazard potential with the vehicle. The method further includes detecting a gesture, by a driver, associated with the detected condition. The method further includes, in response to detecting the gesture, reducing an urgency level for alerting the driver of the detected condition to generate a reduced urgency level. The method further includes determining whether to issue an alert to the driver based on the reduced urgency level.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that the driver state and reaction tracking system determines whether the driver of a vehicle has detected a dangerous condition with reduced cognitive load relative to prior techniques involving traditional user interfaces. As a result, the driver state and reaction tracking system is able to receive an acknowledgement of a dangerous condition without unduly distracting the driver. By contrast, with prior techniques, a driver may acknowledge a dangerous condition by pushing a button or touching a touch screen of the human-machine interface (HMI) in the center console of the vehicle. As a result, the attention of the driver is diverted from the road to the HMI, thereby significantly increasing the likelihood of distracted driving and increasing cognitive load of the driver. In addition, the likelihood that the driver state and reaction tracking system needlessly warns the driver of a detected dangerous condition is reduced. Therefore, the driver is more likely to receive warnings for only those dangerous conditions that the driver has not detected or acknowledged. These technical advantages represent one or more technological improvements over prior art approaches.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosure subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Figure 1:
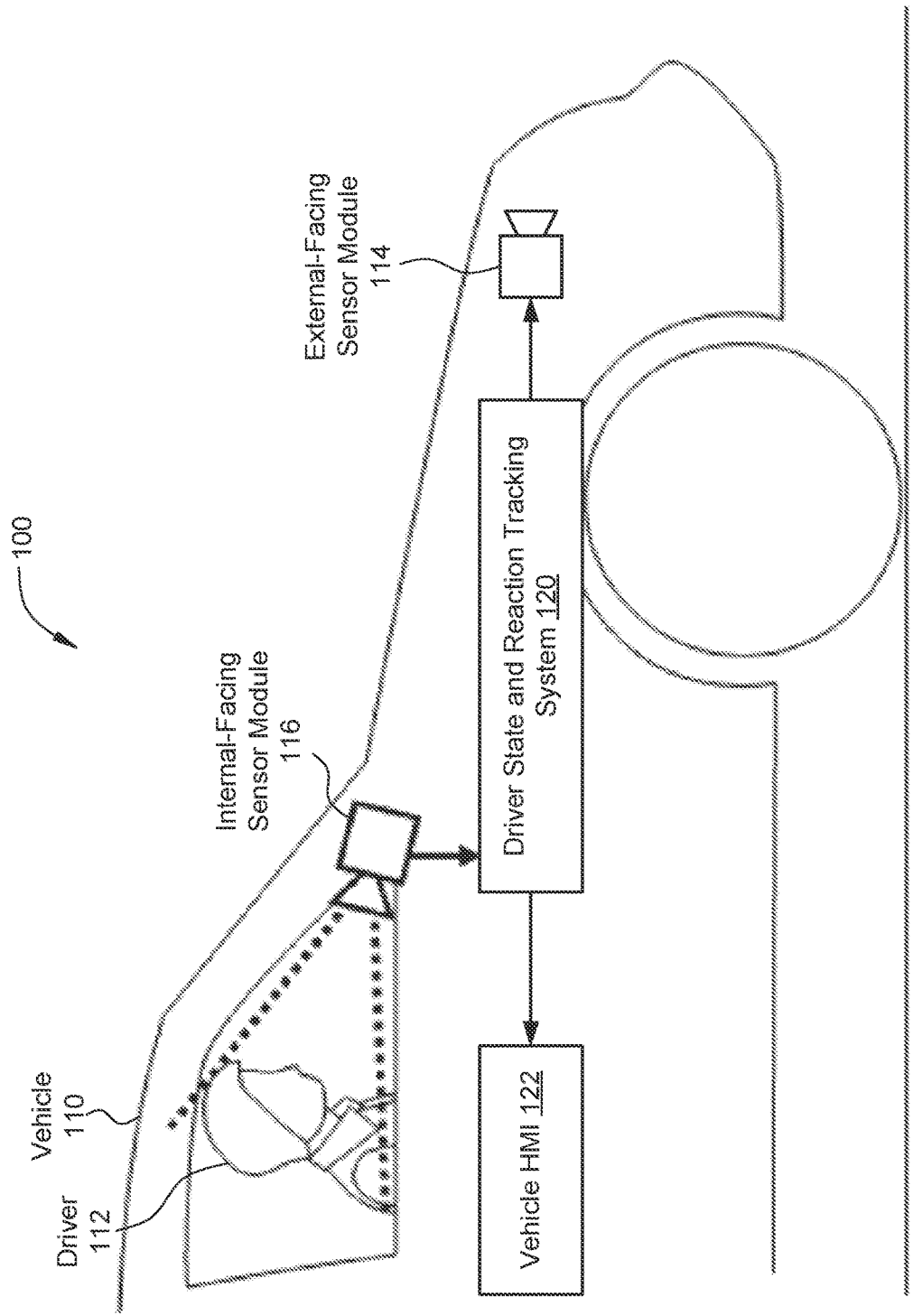
FIG. 1 illustrates a system configured to implement one or more aspects of the various embodiments.

FIG. 1 illustrates a system 100 configured to implement one or more aspects of the various embodiments. As shown, the system 100 includes, without limitation, a vehicle 110, a driver 112, an external-facing sensor module 114, an internal-facing sensor module 116, a driver state and reaction tracking system 120, and a vehicle human-machine interface (HMI) 122. The sensors included in the external-facing sensor module 114 and the internal-facing sensor module 116 are typical of sensors included in certain semiautonomous vehicles, such as level 3 (L3) semiautonomous vehicles, level 4 (L4) semiautonomous vehicles, and/or the like. Further, the sensors included in the internal-facing sensor module 116 are typical of sensors used in conjunction with a driver monitoring system (DMS).

In operation, the driver state and reaction tracking system 120 determines the awareness level of the driver 112 of the vehicle 110 by measuring the driver state and intentions. The driver state and reaction tracking system 120 measures the driver state and intentions via a DMS, not shown, included in the driver state and reaction tracking system 120. Via the DMS, the driver state and reaction tracking system 120 receives measurement data from the internal-facing sensor module 116. The internal-facing sensor module 116 includes microphones, infrared sensors, ultrasound sensors, radar sensors, thermal imaging sensors, heartrate and breathing monitors, blood oxygenation sensors, vehicle instrument sensors, and/or the like. By analyzing the measurement data from the internal-facing sensor module 116, the driver state and reaction tracking system 120 determines the overall physiological state of the driver 112, which may include an awareness level of the driver 112.

The external-facing sensor module 114 includes a visual sensor, such as a camera, ultrasonic sensors, radar sensors, laser sensors, light detection and ranging (LIDAR) sensors, thermal sensors, and/or depth sensors, such as time-of-flight (TOF) sensors, structured light sensors, and/or the like. Additionally or alternatively, the external-facing sensor module 114 includes global navigation satellite system (GNSS) receivers, global positioning system (GPS) receivers, inertial measurement units (IMUs), LIDAR detectors, radar detectors, infrared sensors, and/or the like. By analyzing the measurement data from the external-facing sensor module 114, the driver state and reaction tracking system 120 tracks the location of pedestrians, vehicles, obstacles, and/or the like along with other objects within the environment.

Further, the driver state and reaction tracking system 120 determines the eye gaze direction of the driver 112 via the internal-facing sensor module 116 and determines, via the external-facing sensor module 114, the location of pedestrians, vehicles, obstacles, and/or other objects in the environment. The driver state and reaction tracking system 120 determines whether the eye gaze direction and/or the eye vergence point of the driver 112 intersects with the location of the pedestrians and/or other objects to determine whether the driver 112 is looking at pedestrians, vehicles, obstacles, and/or other objects, at another portion of the road ahead, or in some other direction.

Further, the driver state and reaction tracking system 120 determines the drowsiness and fatigue level of the driver 112 by measuring the opening of the eye lids of the driver 112. Additionally or alternatively, the driver state and reaction tracking system 120 may include advanced driver state classifiers for detecting whether the driver 112 is texting on their mobile device and whether the driver 112 is currently under high stress, under a high cognitive load, in a highly emotional state, and/or the like. Based on any one or more of these metrics, the driver state and reaction tracking system 120 determines the awareness level of the driver 112, along with the driver's overall capability of the driver 112 to engage in careful driving and/or to react properly to the environment outside the vehicle 110.

In addition, the driver state and reaction tracking system 120 detects acknowledgements in the form of predetermined gestures issued by the driver 112 in reaction to certain potentially hazardous conditions. In this regard, the driver state and reaction tracking system 120 detects, via the external-facing sensor module 114, one or more potentially hazardous conditions, such as pedestrians attempting to cross the road ahead of the vehicle 110, bicycles turning at a crosswalk, objects in the path of the vehicle 110, and/or the like. The driver state and reaction tracking system 120 determines, via the internal-facing sensor module 116, whether the driver is looking in the direction of a particular potentially hazardous condition. In so doing, the driver state and reaction tracking system 120 determines the eye gaze direction of the driver 112 to detect whether the driver 112 is looking in the direction of the potentially hazardous condition. Additionally or alternatively, the driver state and reaction tracking system 120 determines the eye vergence of the eyes of the driver 112 to detect whether the eyes of the driver 112 are converging on the potentially hazardous condition. The driver state and reaction tracking system 120 determines whether the driver 112 has acknowledged seeing the potentially hazardous condition by detecting a specific predetermined gesture issued by the driver 112 during the time that the driver 112 is looking in the direction of the potentially hazardous condition and/or the eyes of the driver 112 are converging on the potentially hazardous condition. The detection of the predetermined gesture issued by the driver 112 increases the confidence level that the driver 112 has both looked in the direction of the potentially hazardous condition and has actually perceived the potentially hazardous condition.

The predetermined gesture may be any one or more non-verbal signals issued by the driver 112, where the predetermined gesture provides explicit feedback to the driver state and reaction tracking system 120 that the driver 112 has both looked in the direction of the potentially hazardous condition and has actually perceived the potentially hazardous condition. In general, the predetermined gesture is indicative that the driver 112 has issued the feedback consciously. However, the predetermined gesture is also subtle, in that the predetermined gesture does not unduly interrupt the attention of the driver 112 of the primary task of driving, or any other essential activity.

The predetermined gesture may include a non-verbal facial gesture, such as raising the eyebrows, flaring and/or expanding the nostrils, tightening the nostrils to compress or "scrunch" the nose, pursing the lips, and/or the like. Similarly, the driver state and reaction tracking system 120 may perform computer vision analysis on the face of the driver 112 to determine whether the driver 112 has mouthed a specific word or phrase, such as "I see you." Additionally or alternatively, the predetermined gesture may include a manual gesture of another body part, such as curling the toes, flexing the toes, tapping the left foot, and/or the like. The driver state and reaction tracking system 120 may detect such a manual gesture via an IMU or similar sensor placed near the driver's left foot in order to detect the vibration from the foot tap or other manual gesture.

Additionally or alternatively, the predetermined gesture may include a manual input, such as briefly covering a flashing light segment on a steering wheel outfitted with a set of flashing light segment disposed along the edge of the steering wheel. The light segments could include light-emitting diodes (LEDs), liquid crystal displays (LCDs), and/or other visual indicators. Additionally or alternatively, the predetermined gesture may include thinking certain "key thoughts" as detected by an electro-encephalogram (EEG) device disposed within the headrest, the steering wheel, a bracelet worn by the driver 112, and/or the like. The key thought may be any nonce word or short phrase that is easy to remember but does not commonly occur in day-to-day thinking activities, such as "pink elephant," "granola tower," "furry tree," and/or the like.

Additionally or alternatively, the predetermined gesture may include haptic output and feedback. For example, if the driver state and reaction tracking system 120 detects a potentially hazardous condition, the driver state and reaction tracking system 120 may generate a haptic output, such as increasing the thickness of the steering wheel, vibrating a portion of the steering wheel, generating a set of tactile bumps on the steering wheel, and/or the like. The driver 112 may then acknowledge the potentially hazardous condition by squeezing and/or applying a compressive force to the steering wheel. Additionally or alternatively, the driver state and reaction tracking system 120 may detect a sharp exhale from the nostrils of the driver 112 by detecting an increase in carbon dioxide levels near the head of the driver 112. The driver state and reaction tracking system 120 may detect carbon dioxide levels via a nondispersive infrared, or chemical carbon dioxide sensor be placed close to the driver 112, such as above the head of the driver 112.

If the driver state and reaction tracking system 120 determines that the driver 112 has made eye contact with the potentially hazardous condition, based on the intersection of the eye gaze direction and/or the eye vergence point of the driver 112 with the location of the potentially hazardous condition, then the driver state and reaction tracking system 120 reduces the urgency for alerting the driver 112 by a first amount, such as 30%. If the driver state and reaction tracking system 120 determines that the driver 112 has made eye contact with the potentially hazardous condition, and has issued a corresponding predetermined gesture, then the driver state and reaction tracking system 120 reduces the urgency for alerting the driver 112 by a second amount, such as 100%. As a result, when the driver 112 makes eye contact with the potentially hazardous condition and/or issues the corresponding predetermined gesture, then the driver state and reaction tracking system 120 reduces or eliminates the urgency to alert the driver 112 of the potentially hazardous condition. If the driver 112 does not makes eye contact with the potentially hazardous condition and does not issue the corresponding predetermined gesture, then the driver state and reaction tracking system 120 issues an alert to the driver 112 via an output device included in the vehicle HMI 122.

In some embodiments, the driver state and reaction tracking system 120 may transmit an acknowledgement to other systems associated with pedestrians, bicyclists, motorcyclists, semiautonomous vehicles, manually driven vehicles and/or the like. The driver state and reaction tracking system 120 may transmit the acknowledgement to other systems via any technically feasible communications protocol, including Wave messages via a peer-to-peer protocol over 802.11p, Bluetooth, 3GPP Cellular V2X (C-V2X), and/or the like. In general, the driver state and reaction tracking system 120 exchanges messages via any wireless low-power point-to-point communication protocol between the driver state and reaction tracking system 120 and other systems. The acknowledgment confirms, to the other system, that the driver 112 of the vehicle 110 associated with the driver state and reaction tracking system 120 has seen the pedestrian, bicyclist, motorcyclist, or vehicle associated with the other system.

If the other system is associated with a pedestrian, then the other system may generate an alert and may transmit the alert to a device associated with the pedestrian, such as headphones, smartphone, smart bracelet, smart ring, and/or the like. The alert may be in the form of an audio cue, a synthesized voice alert, a haptic output, and/or the like. If the other system is associated with a bicyclist or motorcyclist, then the other system may generate an alert and may transmit the alert to a device associated with the bicyclist or motorcyclist, such as a transceiver integrated into a helmet. The alert may be in the form of an audio cue, a synthesized voice alert, a haptic output, and/or the like. If the other system is associated with a semiautonomous vehicle, then the other system may use the acknowledgement in the analysis to determine whether to brake, slow down, take other evasive action, and/or the like. If the other system is associated with a manually driven vehicle, then the other system may generate an alert and may transmit the alert to the HMI system of the manually driven vehicle, such that the driver of the manually driven vehicle receives the alert. The alert may be in the form of an audio cue, a synthesized voice alert, a haptic output, and/or the like.

In one example, the vehicle 110 is an L3 or L4 semiautonomous vehicle equipped with an external-facing sensor module 114 and an internal-facing sensor module 116. The driver 112 is operating the vehicle 110 in manual mode. The driver 112 stops the vehicle 110 at a four-way intersection and signals, via the turn signal, that the driver 112 is about to make a left turn. The driver state and reaction tracking system 120 detects objects in the environment, including a bicycle that is crossing the intersection into the intended path of the vehicle 110. The driver state and reaction tracking system 120 determines that an alert should be generated to alert the driver of the bicycle. Prior to generating the alert, the driver state and reaction tracking system 120 determines that the driver has issued a predetermined gesture while looking in the direction of the bicycle. Therefore, the driver state and reaction tracking system 120 determines that no alert needs to be generated. Further, if the rider of the bicycle is wearing a headset that is in communication with the driver state and reaction tracking system 120, then the driver state and reaction tracking system 120 transmits a message to the headset indicating that the driver 112 of the vehicle 110 has acknowledged seeing the bicycle.

Figure 2:
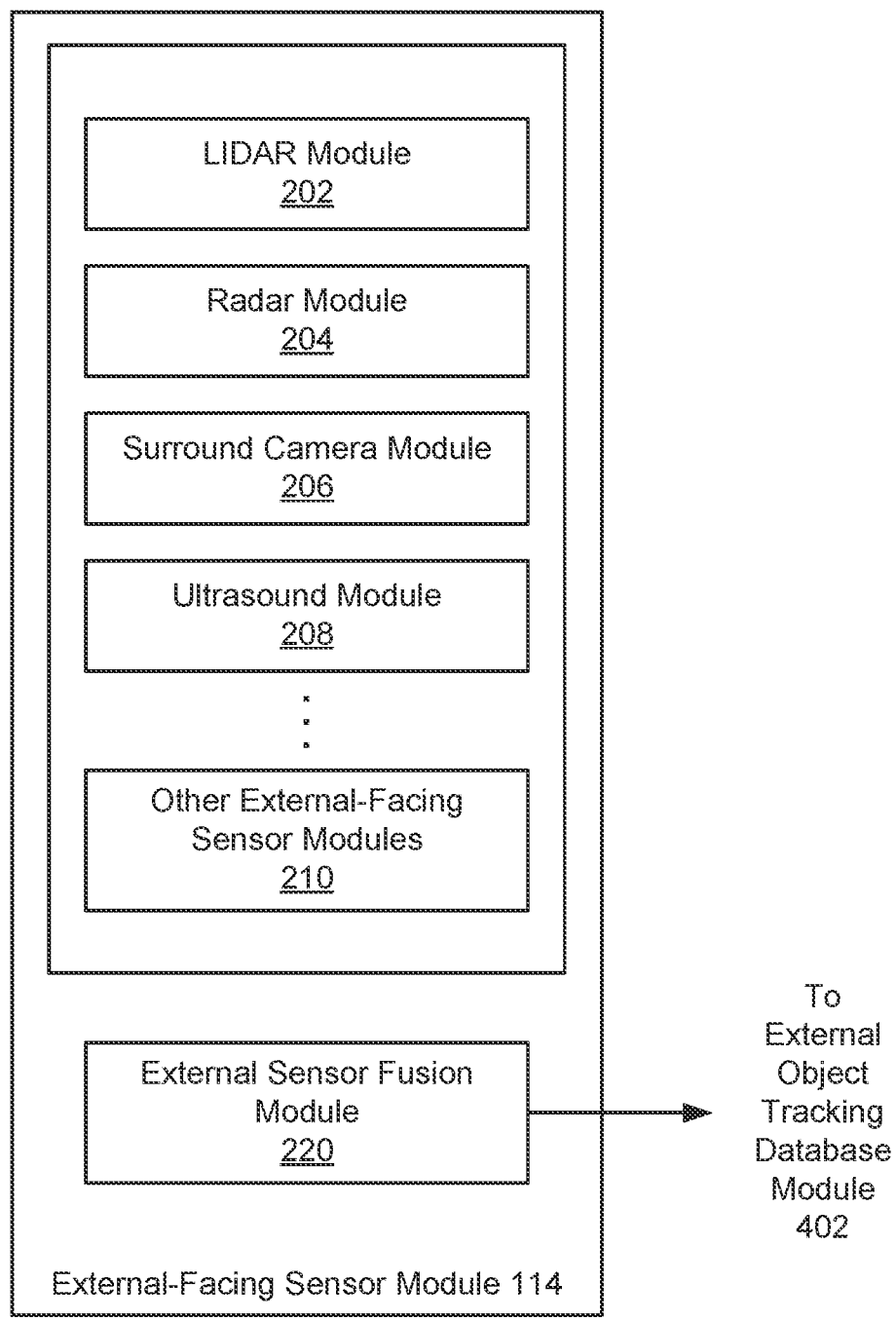
FIG. 2 illustrates a more detailed view of the external-facing sensor module of FIG. 1, according to various embodiments.

FIG. 2 illustrates a more detailed view of the external-facing sensor module 114 of FIG. 1, according to various embodiments. The external-facing sensor module 114 includes, without limitation, one or more of a LIDAR module 202, a radar module 204, a surround camera module 206, an ultrasound module 208, other external-facing sensor modules 210, and/or an external sensor fusion module 220.

The LIDAR module 202 includes light detection and ranging (LIDAR) sensors and associated processing circuitry that detects objects in the environment and measures the distance between those objects and the vehicle 110. The LIDAR module 202 illuminates a target object with an optical pulse signal and measures the characteristics of the return signal reflected off of the object. The radar module 204 includes radio detection and ranging (radar) sensors and associated processing circuitry that detects the speed of objects in the environment and measures the distance between those objects and the vehicle 110. The radar module 204 transmits radio waves towards a target object, where the radio waves strike and reflect off of the object. The radar module 204 measures the characteristics of the return signal reflected off of the object.

The surround camera module 206 includes surround view cameras and associated processing circuitry that detects objects in the environment and measures the distance between those objects and the vehicle 110. The surround camera module 206 captures images at various points around the perimeter of the vehicle 110. The surround camera module 206 stitches the images together and analyzed the images to estimate the location various objects illustrated in the images and the vehicle 110 and estimate the distance between those objects and the vehicle 110. The ultrasound module 208 includes ultrasound sensors and associated processing circuitry that detects objects in the environment and measures the distance between those objects and the vehicle 110. The ultrasound module 208 transmits sound waves towards a target object, where the sound waves strike and reflect off of the object. The ultrasound module 208 measures the characteristics of the return signal reflected off of the object. Other external-facing sensor modules 210 include various additional sensors and associated processing circuitry that detects objects in the environment and measures the distance between those objects and the vehicle 110.

The external sensor fusion module 220 integrates the output of one or more of the LIDAR module 202, the radar module 204, the surround camera module 206, the ultrasound module 208, and/or the other external-facing sensor modules 210. In so doing, external sensor fusion module 220 determines the types, locations, and/or speeds of external potentially hazardous conditions relevant to the vehicle, such as other road users (such as pedestrians, bicyclists, motorcyclists, and other vehicles), landmarks (such as traffic lights and buildings), the signal color and pedestrian indicator on detected traffic lights, and/or the like. The external sensor fusion module 220 transmits the types, locations, and/or speeds of these external objects to the external object tracking database module 402 of the driver state and reaction tracking system 120.

Figure 3:
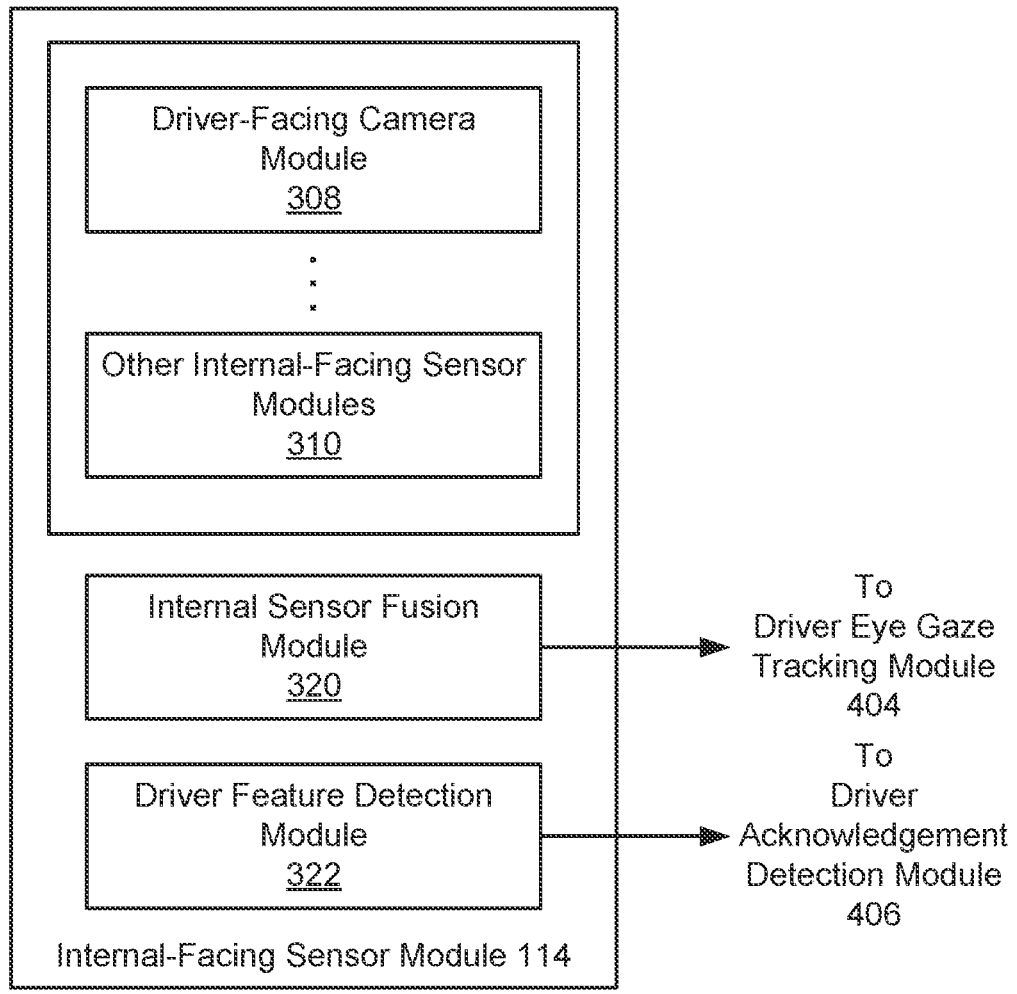
FIG. 3 illustrates a more detailed view of the internal-facing sensor module of FIG. 1, according to various embodiments.

FIG. 3 illustrates a more detailed view of the internal-facing sensor module 116 of FIG. 1, according to various embodiments. The internal-facing sensor module 116 includes, without limitation, one or more of a driver-facing camera module 308, other internal-facing sensor modules 310, an internal sensor fusion module 320, and/or a driver feature detection module 322.

The driver-facing camera module 308 includes one or more cameras, such as infrared (IR) cameras, red-green-blue (RGB) cameras, and/or the like, along with associated processing circuitry. The cameras included in the driver-facing camera module 308 face the driver 112 and detect eye gaze direction and/or eye vergence to determine where the driver 112 is looking. The cameras included in the driver-facing camera module 308 detect the eye lid opening, eye lid position, and/or eye lid blink rate of the driver 112 in order to determine the fatigue level of the driver.

The other internal-facing sensor modules 310 include one or more microphones, infrared sensors, ultrasound sensors, radar sensors, thermal imaging sensors, heartrate and breathing monitors, blood oxygenation sensors, vehicle instrument sensors, and/or the like, along with associated processing circuitry. By analyzing the measurement data from the internal-facing sensor module 116, the driver state and reaction tracking system 120 determines the overall physiological state of the driver 112.

The internal sensor fusion module 320 integrates the output of one or more of the driver-facing camera module 308 and/or the other internal-facing sensor modules 310 to determine the eye gaze direction and/or the eye vergence of the driver 112. The internal sensor fusion module 320 transmits the eye gaze direction and/or the eye vergence of the driver 112 to the driver eye gaze tracking module 404 of the driver state and reaction tracking system 120.

The driver feature detection module 322 integrates the output of one or more of the driver-facing camera module 308 and/or the other internal-facing sensor modules 310 to collect sensor data indicative of whether the driver 112 has issued one or more predetermined gestures. As described herein, the predetermined gestures include one or more facial gestures, other body gestures, manual input, key thoughts, haptic input signals (such as squeezing and/or applying a compressive force to the steering wheel), a sharp exhale, and/or the like. The driver feature detection module 322 transmits the sensor data relevant to the predetermined gestures to the driver acknowledgement detection module 406 of the driver state and reaction tracking system 120.

Figure 4:
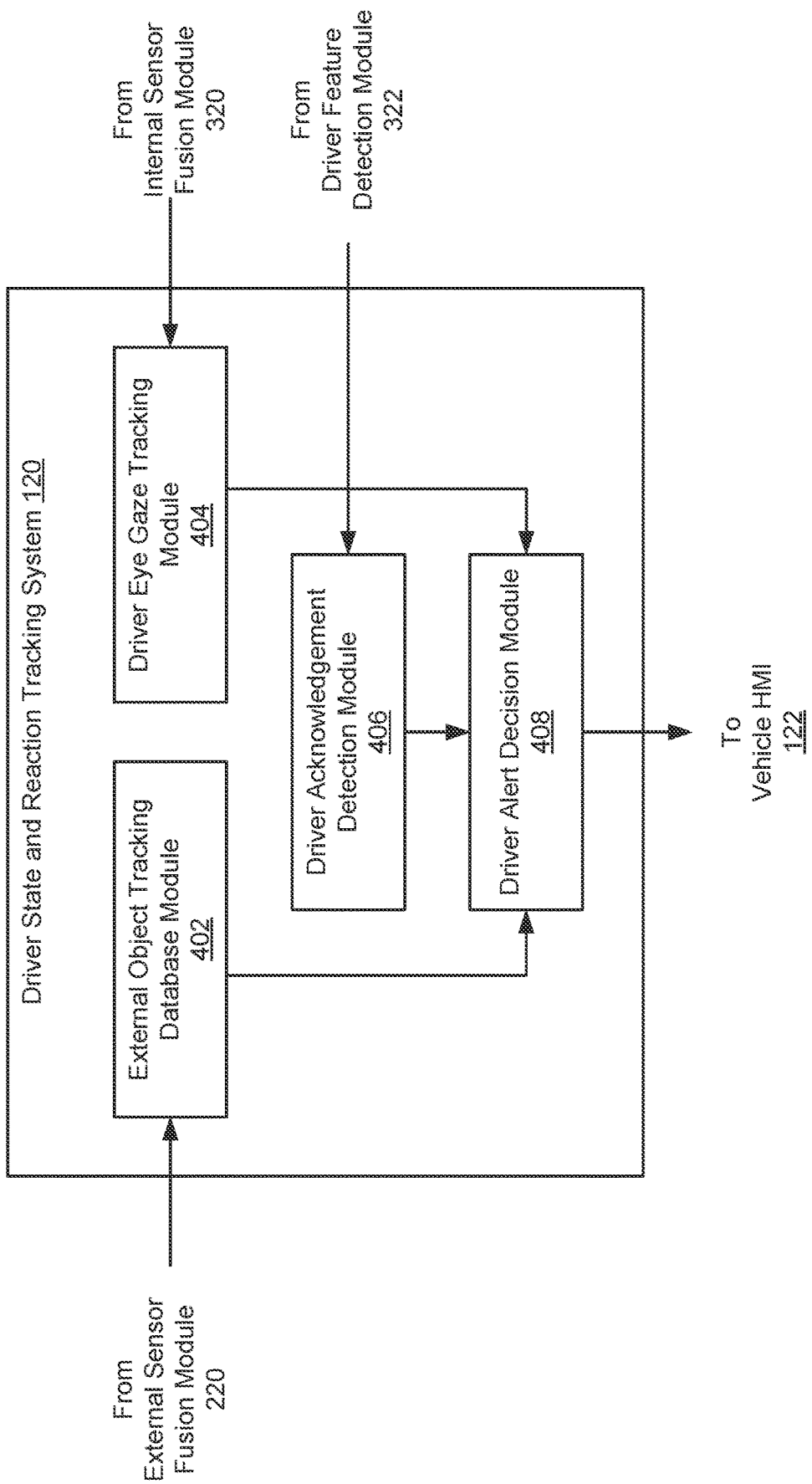
FIG. 4 illustrates a more detailed view of the driver state and reaction tracking system of FIG. 1, according to various embodiments.

FIG. 4 illustrates a more detailed view of the driver state and reaction tracking system 120 of FIG. 1, according to various embodiments. The driver state and reaction tracking system 120 includes, without limitation, an external object tracking database module 402, a driver eye gaze tracking module 404, a driver acknowledgement detection module 406, and a driver alert decision module 408.

The external object tracking database module 402 receives the types, location, and/or speeds of objects in the vicinity of the vehicle 110 that have been detected by the external sensor fusion module 220. The external object tracking database module 402 prioritizes the objects based on the potential for posing a hazardous condition to the vehicle 110. For example, a pedestrian walking in front of the vehicle may pose a high potential of a hazardous condition. A traffic signal with an illuminated yellow indicator may pose a medium potential of a hazardous condition. A building located to the side of the vehicle 110 may pose a low potential of a hazardous condition. The external object tracking database module 402 transmits the prioritized list of objects and/or the locations of ongoing events of interest to the driver alert decision module 408.

The driver eye gaze tracking module 404 receives the eye gaze direction and/or the eye vergence of the driver 112 from the internal sensor fusion module 320. The eye gaze direction and/or the eye vergence of the driver 112 are indicative of whether the driver has perceived an object that lies along the direction that the driver 112 is looking. In some embodiments, the driver eye gaze tracking module 404 may be included in the DMS of the vehicle 110. The driver eye gaze tracking module 404 transmits the eye gaze direction and/or the eye vergence of the driver 112 to the driver alert decision module 408.

The driver acknowledgement detection module 406 receives sensor data indicative of whether the driver 112 has issued one or more predetermined gestures from the driver feature detection module 322. The driver acknowledgement detection module 406 processes the sensor data to determine whether the driver 112 has issued a predetermined gesture that is recognized by the driver state and reaction tracking system 120. The driver feature detection module 322 analyzes image data from one or more cameras and/or other sensors to detect facial landmarks of the driver 112, such as various points on the nose, the eyes, the eyebrows, the lips, the chin, and/or the like. More specifically, the driver feature detection module 322 determines the two-dimensional (X-Y) or three-dimensional (X-Y-Z) locations of certain points on the face of the driver 112. The driver feature detection module 322 determines the locations of any number of points on the face of the driver 112, typically ranging from about 10 points to about 100 points or more. The driver feature detection module 322 determines the locations of these points multiple times per second, typically in the range of 10 times per second to 200 times per second or more. The points can include the corners of the mouth, the tip of the nose, the center of each nostril, the bridge of the nose, the left, center, and/or right point of each eyebrow, and/or the like. The locations of these points may be relative to an anchor point, such as a certain point on the face of the driver 112.

The driver acknowledgement detection module 406 then analyzes the facial landmark data to determine whether the driver 112 has issued a predetermined gesture in the form of a non-verbal facial gesture. More particularly, the driver acknowledgement detection module 406 analyzes the location data for the 10 to 100 (or more) points acquired at a rate of 10 to 200 (or more times per second in order to determine whether at least a portion of the point location data is indicative of one or more facial gestures issued by the driver 112. Such a non-verbal facial gesture includes raising the eyebrows, flaring, and/or expanding the nostrils, tightening the nostrils to compress or "scrunch" the nose, pursing the lips, and/or the like. For example, the driver acknowledgement detection module 406 may detect a particular facial gesture by analyzing the changes in location of certain facial landmark points. The driver acknowledgement detection module 406 may track the middle point of each eyebrow of the driver 112. If the driver acknowledgement detection module 406 determines that one or both of the middle point of the eyebrows of the driver 112 change in Y position to move up and then down relative to the anchor point, then the driver acknowledgement detection module 406 may determine that an "eyebrow raising event" is detected.

In some embodiments, the driver acknowledgement detection module 406 may determine the amount of time that elapsed during the up and down change in Y position and compare the amount of time against one or both of a lower threshold or an upper threshold. If the amount of time during the up and down change in Y position is greater than the lower threshold and/or less than the upper threshold, then the driver acknowledgement detection module 406 may classify the up and down change in Y position as an eyebrow raising event. Similarly, the driver acknowledgement detection module 406 may determine the distance of the up and down change in Y position and compare the distance against one or both of a lower threshold or an upper threshold. If the distance of the up and down change in Y position is greater than the lower threshold and/or less than the upper threshold, then the driver acknowledgement detection module 406 may classify the up and down change in Y position as an eyebrow raising event. Additionally or alternatively, the driver acknowledgement detection module 406 analyzes the facial landmark data to determine whether the driver 112 has mouthed a particular word or short phrase, such as "I see you." Similarly, the driver acknowledgement detection module 406 analyzes sensor data to determine whether the driver has issued a predetermined gesture in some other form, such as other body gestures, manual input, key thoughts, haptic input signals, a sharp exhale, and/or the like. The driver acknowledgement detection module 406 transmits data identifying predetermined gestures issued by the driver 112 to the driver alert decision module 408.

The driver alert decision module 408 receives the prioritized list of detected objects and/or the locations of ongoing events of interest from the external object tracking database module 402. In addition, the driver alert decision module 408 receives the eye gaze direction and/or the eye vergence of the driver 112 from the driver eye gaze tracking module 404. Further, the driver alert decision module 408 receives data identifying predetermined gestures issued by the driver 112 from the driver acknowledgement detection module 406. Based on the received data, the driver alert decision module 408 issues one or more alerts to the driver 112.

More specifically, the driver alert decision module 408 analyzes the prioritized list of detected objects to determine an urgency level for each detected object, where the urgency level indicates how likely the detected object poses a potentially hazardous condition for the driver 112. The driver alert decision module 408 compares the urgency level for each detected object against a threshold level. If the urgency level is less than the threshold level, then the driver alert decision module 408 determines that no alert needs to be generated for that detected object. If, on the other hand, the urgency level is greater than the threshold level, then the driver alert decision module 408 determines that an alert may need to be generated for that detected object, unless the driver has looked in the direction of the object and/or has issued a predetermined gesture for that object.

For each detected object in the prioritized list, the driver alert decision module 408 determines whether the driver 112 is looking in the direction of the detected object, based on the eye gaze direction and/or the eye vergence of the driver 112. If the driver 112 is looking in the direction of the detected object, then the driver alert decision module 408 reduces the urgency associated with the corresponding detected object by a certain amount or percentage. For example, if the urgency level is expressed as a value between 0.000 and 1.000, where a higher number represents greater urgency, then the driver alert decision module 408 may subtract a fixed amount from the urgency level, such as 0.200, 0.300, 0.350, and/or the like. During the subtraction operation, the driver alert decision module 408 may limit the urgency level to be no less than 0.000. Additionally or alternatively, the driver alert decision module 408 may reduce the urgency level by a fixed percentage, such as 25%, 30%, 40%, and/or the like.

Then, for each detected object in the prioritized list, the driver alert decision module 408 determines whether the driver 112 has issued a predetermined gesture during a time that the driver 112 is looking in the direction of the detected object. If the driver 112 issues a predetermined gesture while looking in the direction of the detected object, then the driver alert decision module 408 reduces the urgency associated with the corresponding detected object by a certain amount or percentage. For example, if the urgency level is expressed as a value between 0.000 and 1.000, where a higher number represents greater urgency, then the driver alert decision module 408 may subtract a fixed amount from the urgency level, such as 0.850, 0.900, 1.000, and/or the like. During the subtraction operation, the driver alert decision module 408 may limit the urgency level to be no less than 0.000. Additionally or alternatively, the driver alert decision module 408 may reduce the urgency level by a fixed percentage, such as 75%, 90%, 100%, and/or the like.

After reducing the urgency levels for the detected objects, the driver alert decision module 408 ranks the detected objects based on the reduced urgency levels. The driver alert decision module 408 generates alerts for one or more detected objects based on the ranking and the time of the last alert for each object. Further, the driver alert decision module 408 may limit the number of alerts to generate at a given time. For example, a first object that originally had a high urgency level may have a reduced urgency level if the driver 112 has looked in the direction of the object and/or has issued a predetermined gesture for that object. If the reduced urgency level is sufficiently low, the driver alert decision module 408 may determine that no alert is needed for the corresponding object. If, however, the reduced urgency level is still sufficiently high, the driver alert decision module 408 may generate an alert associated with the corresponding object.

In addition, if the driver alert decision module 408 has previously generated an alert for the object, the driver alert decision module 408 may compare a current time with the time of the last alert for the object. If the difference between the current time with the time of the last alert for the object is less than a threshold amount, such as 1.0 seconds, 2.0 seconds, 3.5 seconds, and/or the like, then the driver alert decision module 408 may determine that no alert is needed for the corresponding object. If, however, the difference between the current time with the time of the last alert for the object is greater than the threshold amount, then the driver alert decision module 408 generates an alert for the corresponding object. In some embodiments, the threshold amount may be based on the urgency level, where the threshold amount decreases as the urgency level increases. The driver alert decision module 408 then timestamps and stores the generated alerts.

Figure 5:
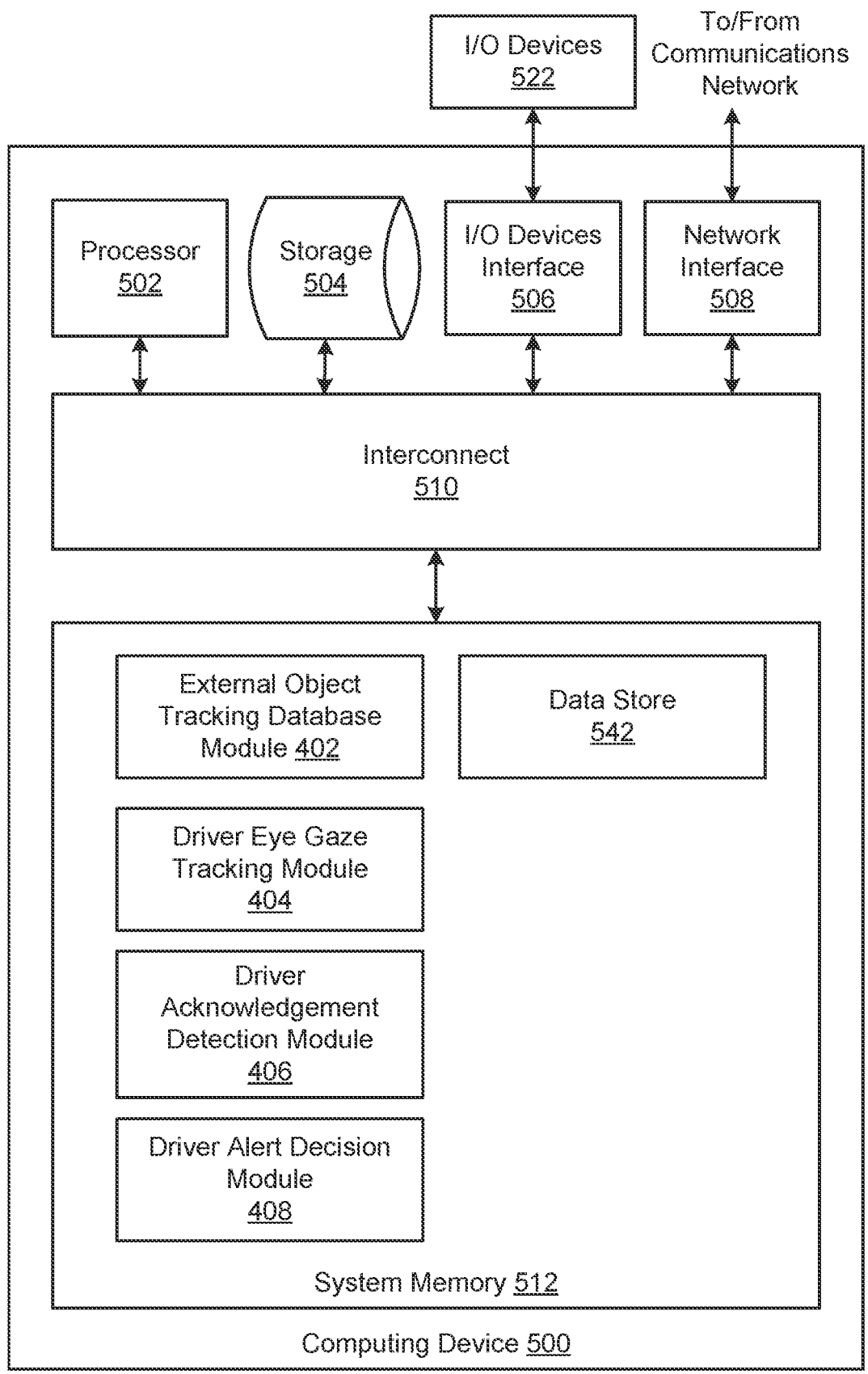
FIG. 5 is a block diagram of a computing device that may be implemented in conjunction with or coupled to driver state and reaction tracking system of FIGS. 1 and 4, according to various embodiments.

FIG. 5 is a block diagram of a computing device 500 that may be implemented in conjunction with or coupled to driver state and reaction tracking system 120 of FIGS. 1 and 4, according to various embodiments. As shown, the computing device 500 includes, without limitation, a processor 502, storage 504, an input/output (I/O) devices interface 506, a network interface 508, an interconnect 510, and a system memory 512.

The processor 502 retrieves and executes programming instructions stored in the system memory 512. Similarly, the processor 502 stores and retrieves application data residing in the system memory 512. The interconnect 510 facilitates transmission, such as of programming instructions and application data, between the processor 502, I/O devices interface 506, storage 504, network interface 508, and system memory 512. The I/O devices interface 506 is configured to receive input data from user I/O devices 522. Examples of user I/O devices 522 may include one or more buttons, a keyboard, a mouse or other pointing device, and/or the like. The I/O devices interface 506 may also include an audio output unit configured to generate an electrical audio output signal, and user I/O devices 522 may further include a speaker configured to generate an acoustic output in response to the electrical audio output signal. Another example of a user I/O device 522 is a display device that generally represents any technically feasible means for generating an image for display. For example, the display device could be a liquid crystal display (LCD) display, organic light-emitting diode (OLED) display, or digital light processing (DLP) display. The display device may be a TV that includes a broadcast or cable tuner for receiving digital or analog television signals. The display device may be included in a head-mounted display (HMD) assembly such as a VR/AR headset or a heads-up display (HUD) assembly. Further, the display device may project an image onto one or more surfaces, such as walls, projection screens or a windshield of a vehicle. Additionally or alternatively, the display device may project an image directly onto the eyes of a user (e.g., via retinal projection).

Processor 502 is included to be representative of a single central processing unit (CPU), multiple CPUs, a single CPU having multiple processing cores, digital signal processors (DSPs), field-programmable gate arrays (FPGAs), graphics processing units (GPUs), tensor processing units, and/or the like. And the system memory 512 is generally included to be representative of a random access memory. The storage 504 may be a disk drive storage device. Although shown as a single unit, the storage 504 may be a combination of fixed and/or removable storage devices, such as fixed disc drives, floppy disc drives, tape drives, removable memory cards, or optical storage, network attached storage (NAS), or a storage area-network (SAN). Processor 502 communicates to other computing devices and systems via network interface 508, where network interface 508 is configured to transmit and receive data via a communications network.

The system memory 512 includes, without limitation, an external object tracking database module 402, a driver eye gaze tracking module 404, a driver acknowledgement detection module 406, a driver alert decision module 408, and a data store 542. The external object tracking database module 402, driver eye gaze tracking module 404, driver acknowledgement detection module 406, and driver alert decision module 408, when executed by the processor 502, perform one or more operations associated with the driver state and reaction tracking system 120 of FIGS. 1 and 4, as further described herein. When performing the operations associated with the driver state and reaction tracking system 120, the external object tracking database module 402, driver eye gaze tracking module 404, driver acknowledgement detection module 406, and driver alert decision module 408 may store data in and retrieve data from data store 542.

Figure 6A:
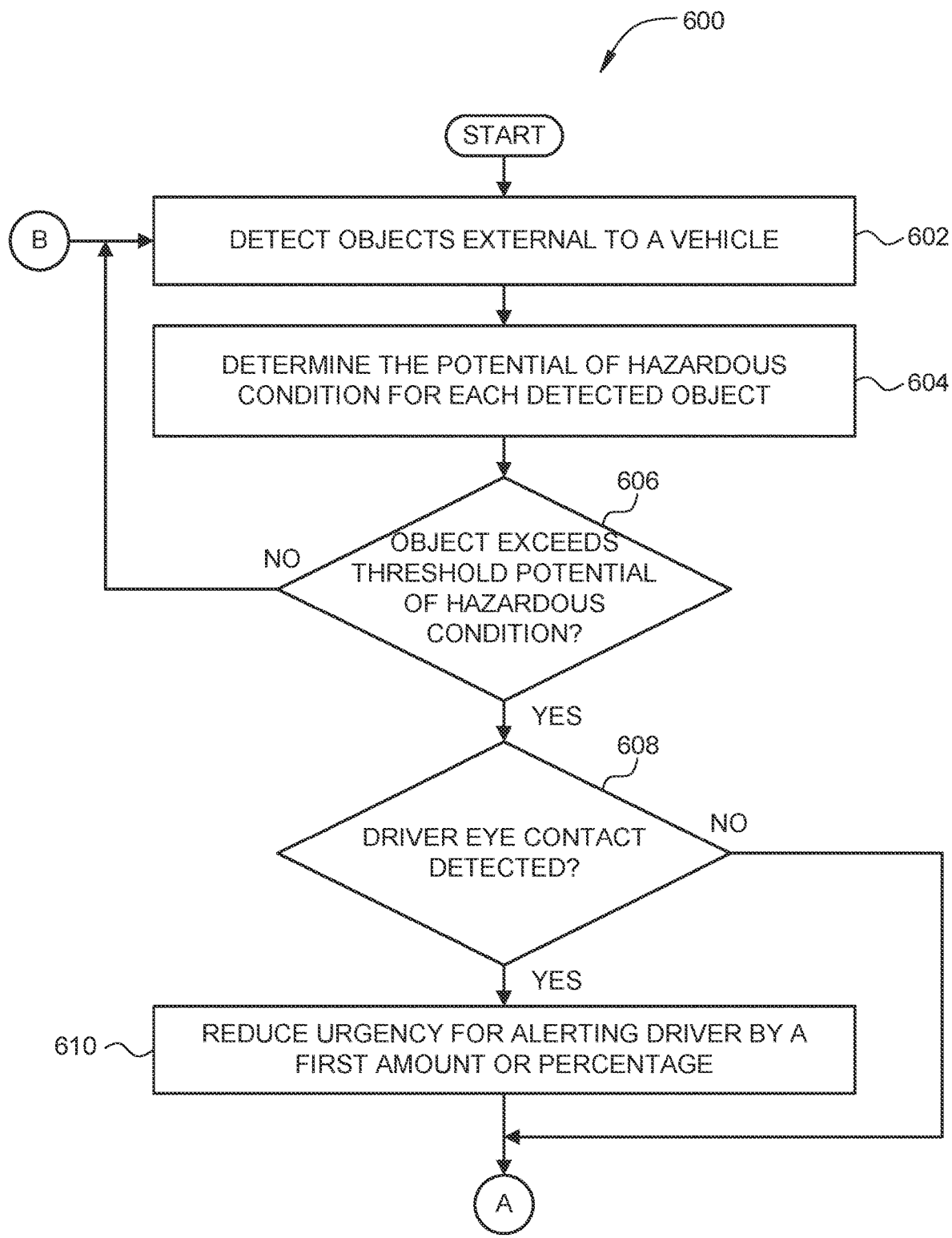
FIGS. 6A-6B set forth a flow diagram of method steps for detecting an acknowledgement from a driver of a vehicle, according to various embodiments.
Figure 6B:
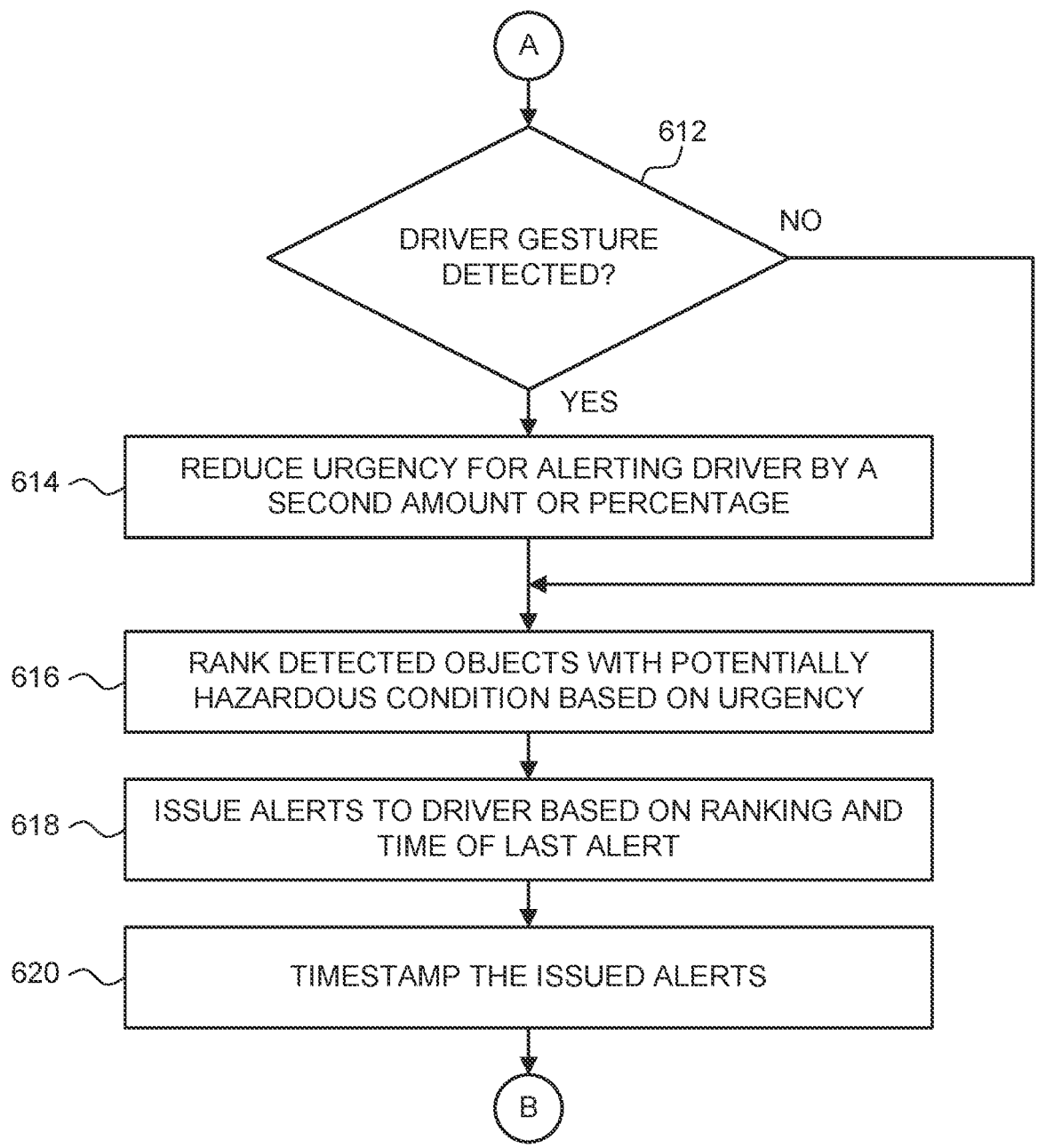

FIGS. 6A-6B set forth a flow diagram of method steps for detecting an acknowledgement from a driver of a vehicle, according to various embodiments. Although the method steps are described in conjunction with the systems of FIGS. 1-5, persons skilled in the art will understand that any system configured to perform the method steps, in any order, is within the scope of the present disclosure.

As shown, a method 600 begins at step 602, where a driver state and reaction tracking system 120 detects potentially hazardous conditions that are external to a vehicle 110. Such potentially hazardous conditions include other road users (such as pedestrians, bicyclists, motorcyclists, and other vehicles), landmarks (such as traffic lights and buildings), the signal color and pedestrian indicator on detected traffic lights, and/or the like. At step 604, the driver state and reaction tracking system 120 determines the hazard potential of the potentially hazardous conditions. The driver state and reaction tracking system 120 analyzes the list of detected potentially hazardous conditions to determine an urgency level for each detected potentially hazardous conditions, where the urgency level indicates likeliness of an occurrence of the detected potentially hazardous condition, the potential for harm of the potentially hazardous condition, the severity of the harm of the potentially hazardous condition, and/or the like.

At step 606, the driver state and reaction tracking system 120 determines whether hazard potential for at least one of the detected potentially hazardous conditions exceeds a threshold level. The driver state and reaction tracking system 120 compares the urgency level for each detected potentially hazardous condition against a threshold level. If the urgency level is less than the threshold level, then the driver state and reaction tracking system 120 determines that no alert needs to be generated for that detected potentially hazardous condition. If, on the other hand, the urgency level is greater than the threshold level, then the driver state and reaction tracking system 120 determines that an alert may need to be generated for that detected potentially hazardous condition, unless the driver has looked in the direction of the potentially hazardous condition and/or has issued a predetermined gesture for that potentially hazardous condition. If no hazard potential exceeds the threshold level, then the method 600 proceeds to step 602, described above.

If, at step 606, at least one hazard potential exceeds the threshold level, then the method 600 proceeds to step 608, where the driver state and reaction tracking system 120 determines whether the driver 112 has made eye contact with the potentially hazardous condition. In particular, for each detected potentially hazardous condition in the prioritized list, the driver state and reaction tracking system 120 determines whether the driver 112 is looking in the direction of the detected potentially hazardous condition, based on the eye gaze direction and/or the eye vergence of the driver 112.

If, at step 608, the driver 112 has made eye contact with the potentially hazardous condition, then the method 600 proceeds to step 610, where the driver state and reaction tracking system 120 reduces the urgency for alerting the driver 112 by a first amount or percentage. For example, if the urgency level is expressed as a value between 0.000 and 1.000, where a higher number represents greater urgency, then the driver state and reaction tracking system 120 may subtract a fixed amount from the urgency level, such as 0.200, 0.300, 0.350, and/or the like. During the subtraction operation, the driver state and reaction tracking system 120 may limit the urgency level to be no less than 0.000. Additionally or alternatively, the driver state and reaction tracking system 120 may reduce the urgency level by a fixed percentage, such as 25%, 30%, 40%, and/or the like. The method 600 then proceeds to step 612, discussed below. If, at step 608, the driver 112 has not made eye contact with the potentially hazardous condition, then the method 600 proceeds to step 616, described below.

Returning to step 612, the driver state and reaction tracking system 120 determines whether the driver 112 has issued a predetermined gesture. The driver state and reaction tracking system 120 analyzes image data from one or more cameras and/or other sensors to detect facial landmarks of the driver 112, such as various points on the nose, the eyes, the eyebrows, the lips, the chin, and/or the like. The driver state and reaction tracking system 120 analyzes the facial landmark data to determine whether the driver 112 has issued a predetermined gesture in the form of a non-verbal facial gesture. Such a non-verbal facial gesture includes raising the eyebrows, flaring, and/or expanding the nostrils, tightening the nostrils to compress or "scrunch" the nose, pursing the lips, and/or the like. Similarly, the driver state and reaction tracking system 120 analyzes sensor data to determine whether the driver has issued a predetermined gesture in some other form, such as other body gestures, manual input, key thoughts, haptic input signals, a sharp exhale, and/or the like. In general, the driver state and reaction tracking system 120 detects that the driver 112 has issued the predetermined gesture at the same time, or substantially the same time, as the driver 112 looked in the direction of the corresponding potentially hazardous condition.

If the driver 112 has issued the predetermined gesture, then the method 600 proceeds to step 614, where the driver state and reaction tracking system 120 reduces the urgency for alerting the driver 112 by a second amount or percentage. For example, if the urgency level is expressed as a value between 0.000 and 1.000, where a higher number represents greater urgency, then the driver state and reaction tracking system 120 may subtract a fixed amount from the urgency level, such as 0.850, 0.900, 1.000, and/or the like. During the subtraction operation, the driver state and reaction tracking system 120 may limit the urgency level to be no less than 0.000. Additionally or alternatively, the driver state and reaction tracking system 120 may reduce the urgency level by a fixed percentage, such as 75%, 90%, 100%, and/or the like. The method 600 then proceeds to step 616, discussed below. If, at step 612, the driver 112 has not issued the predetermined gesture, then the method 600 proceeds to step 616, described below.

At step 616, the driver state and reaction tracking system 120 ranks the detected potentially hazardous conditions based on urgency. At step 618, the driver state and reaction tracking system 120 issues alerts to the driver 112 based on the ranking and/or based on the time of the last alert for the corresponding potentially hazardous condition. At step 620, the driver state and reaction tracking system 120 timestamps the alerts issued in step 618. The method 600 then proceeds to step 602 described above.

In sum, a driver state and reaction tracking system detects one or more potentially hazardous conditions relevant to the operations of a vehicle. The driver state and reaction tracking system determines whether an urgency level of one or more detected potentially hazardous condition exceeds a threshold level. If the urgency for one or more detected potentially hazardous conditions exceeds a threshold level, then the driver state and reaction tracking system determines whether the driver has looked at or made eye contact with a detected potentially hazardous condition. If eye contact with the potentially hazardous condition has occurred, then the driver state and reaction tracking system reduces the urgency for alerting the driver by a first amount or percentage, such as 30%. The driver state and reaction tracking system then determines whether a specific driver gesture has been detected while the driver is looking at or made eye contact with the potentially hazardous condition. If a specific driver gesture has been detected, then the driver state and reaction tracking system reduces the urgency for alerting the driver by a second amount or percentage, such as 100%. After reducing the urgency for alerting the driver for various potentially hazardous conditions, the driver state and reaction tracking system ranks the external potentially hazardous conditions based on urgency level. The urgency may be based on the reduced urgency value, the nature of the potentially hazardous condition, the relative position of the potentially hazardous condition to the vehicle, and/or the like. For each potentially hazardous condition, the driver state and reaction tracking system issues an alert to the driver based on the ranking and on the time of the last alert for that potentially hazardous condition. The driver state and reaction tracking system then timestamps issued alerts for subsequent ranking and alert cycles. In addition, in some embodiments, the driver state and reaction tracking system may transmit an acknowledgement to other systems associated with pedestrians, bicyclists, motorcyclists, semiautonomous vehicles, manually driven vehicles and/or the like. The acknowledgment confirms, to the other system, that the driver of the vehicle 110 associated with the driver state and reaction tracking system has seen the pedestrian, bicyclist, motorcyclist, or vehicle associated with the other system.

At least one technical advantage of the disclosed techniques relative to the prior art is that the driver state and reaction tracking system determines whether the driver of a vehicle has detected a dangerous condition with reduced cognitive load relative to prior techniques involving traditional user interfaces. As a result, the driver state and reaction tracking system is able to receive an acknowledgement of a dangerous condition without unduly distracting the driver. In addition, the likelihood that the driver state and reaction tracking system needlessly warns the driver of a detected dangerous condition is reduced. Therefore, the driver is more likely to receive warnings for only those dangerous conditions that the driver has not detected or acknowledged. These technical advantages represent one or more technological improvements over prior art approaches.

1. In some embodiments, a computer-implemented method for detecting an acknowledgement from a driver of a vehicle comprises: determining that a detected condition exceeds a threshold hazard potential with the vehicle; detecting a gesture, by a driver, associated with the detected condition; in response to detecting the gesture, reducing an urgency level for alerting the driver of the detected condition to generate a reduced urgency level; and determining whether to issue an alert to the driver based on the reduced urgency level.

2. The computer-implemented method according to clause 1, further comprising determining that the driver of the vehicle is looking in a direction of the detected condition at a time of the gesture.

3. The computer-implemented method according to clause 1 or clause 2, wherein the gesture comprises at least one of a facial gesture, a body gesture, a manual input, a key thought, a haptic input signal, or a sharp exhale issued by the driver of the vehicle.

4. The computer-implemented method according to any of clauses 1-3, wherein determining whether to issue the alert to the driver comprises: determining that the reduced urgency level exceeds a threshold level; and generating the alert to issue to the driver.

5. The computer-implemented method according to any of clauses 1-4, wherein determining whether to issue the alert to the driver comprises: determining that the reduced urgency level does not exceed a threshold level; and refraining from generating the alert to issue to the driver.

6. The computer-implemented method according to any of clauses 1-5, wherein detecting the gesture comprises: receiving sensor data from one or more internal-facing sensors; and detecting the gesture based on the sensor data.

7. The computer-implemented method according to any of clauses 1-6, further comprising: receiving sensor data from one or more external-facing sensors; and detecting the condition based on the sensor data.

8. In some embodiments, one or more non-transitory computer-readable media store program instructions that, when executed by one or more processors, cause the one or more processors to perform steps of: determining that a detected condition exceeds a threshold hazard potential; detecting a gesture, by a driver of a vehicle, associated with the detected condition; in response to detecting the gesture, reducing an urgency level for alerting the driver of the detected condition to generate a reduced urgency level; and determining whether to issue an alert to the driver based on the reduced urgency level.

9. The one or more non-transitory computer-readable media according to clause 8, wherein the program instructions, when executed by the one or more processors, cause the one or more processors to further perform the step of determining that the driver of the vehicle is looking in a direction of the detected condition at a time of the gesture.

10. The one or more non-transitory computer-readable media according to clause 8 or clause 9, wherein the detected condition corresponds to an object, and wherein determining that the driver of the vehicle is looking in the direction of the detected condition comprises determining that the driver of the vehicle is looking in a direction of the object.

11. The one or more non-transitory computer-readable media according to any of clauses 8-10, wherein determining that the driver of the vehicle is looking in the direction of the detected condition is based on an eye vergence associated with the driver of the vehicle.

12. The one or more non-transitory computer-readable media according to any of clauses 8-11, wherein the gesture comprises at least one of a facial gesture, a body gesture, a manual input, a key thought, a haptic input signal, or a sharp exhale issued by the driver of the vehicle.

13. The one or more non-transitory computer-readable media according to any of clauses 8-12, wherein determining whether to issue the alert to the driver comprises: determining whether the reduced urgency level exceeds a threshold level; and if the reduced urgency level exceeds the threshold level, then generating the alert to issue to the driver, or, if the reduced urgency level does not exceed the threshold level, then refraining from generating the alert to issue to the driver.

14. In some embodiments, a system comprises: one or more memories storing instructions; and one or more processors coupled to the one or more memories and, when executing the instructions: determine that a detected condition exceeds a threshold hazard potential; detect a gesture, by a driver of a vehicle, associated with the detected condition; in response to detecting the gesture, reduce an urgency level for alerting the driver of the detected condition to generate a reduced urgency level; and determine whether to issue an alert to the driver based on the reduced urgency level.

15. The system according to clause 14, wherein the one or more processors, when executing the instructions, further determine that the driver of the vehicle is looking in a direction of the detected condition at a time of the gesture.

16. The system according to clause 14 or clause 15, wherein the gesture comprises at least one of a facial gesture, a body gesture, a manual input, a key thought, a haptic input signal, or a sharp exhale issued by the driver of the vehicle.

17. The system according to any of clauses 14-16, wherein determining whether to issue the alert to the driver comprises: determining whether the reduced urgency level exceeds a threshold level; and if the reduced urgency level exceeds the threshold level, then generating the alert to issue to the driver, or, if the reduced urgency level does not exceed the threshold level, then refraining from generating the alert to issue to the driver.

18. The system according to any of clauses 14-17, wherein detecting the gesture comprises: receiving sensor data from one or more internal-facing sensors; and detecting the gesture based on the sensor data.

19. The system according to any of clauses 14-18, further comprising: receiving sensor data from one or more external-facing sensors; and detecting the condition based on the sensor data.

20. The system according to any of clauses 14-19, further comprising one or more sensors, wherein the one or more processors, when executing the instructions, further: detect, via the one or more sensors, a second system associated with the detected condition; and transmit, to the second system, a message indicating that the driver has acknowledged the detected condition.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for detecting an acknowledgement from a driver of a vehicle, the method comprising:
   determining that a detected condition exceeds a threshold hazard potential with the vehicle;
   detecting a gesture, by a driver, associated with the detected condition;
   in response to detecting the gesture, reducing an urgency level for alerting the driver of the detected condition to generate a reduced urgency level; and
   determining whether to issue an alert to the driver based on the reduced urgency level.

2. The computer-implemented method of claim 1, further comprising determining that the driver of the vehicle is looking in a direction of the detected condition at a time of the gesture.

3. The computer-implemented method of claim 1, wherein the gesture comprises at least one of a facial gesture, a body gesture, a manual input, a key thought, a haptic input signal, or a sharp exhale issued by the driver of the vehicle.

4. The computer-implemented method of claim 1, wherein determining whether to issue the alert to the driver comprises:
   determining that the reduced urgency level exceeds a threshold level; and
   generating the alert to issue to the driver.

5. The computer-implemented method of claim 1, wherein determining whether to issue the alert to the driver comprises:
   determining that the reduced urgency level does not exceed a threshold level; and
   refraining from generating the alert to issue to the driver.

6. The computer-implemented method of claim 1, wherein detecting the gesture comprises:
receiving sensor data from one or more internal-facing sensors; and
detecting the gesture based on the sensor data.

7. The computer-implemented method of claim 1, further comprising:
receiving sensor data from one or more external-facing sensors; and
detecting the condition based on the sensor data.

8. One or more non-transitory computer-readable media storing program instructions that, when executed by one or more processors, cause the one or more processors to perform steps of:
determining that a detected condition exceeds a threshold hazard potential;
detecting a gesture, by a driver of a vehicle, associated with the detected condition;
in response to detecting the gesture, reducing an urgency level for alerting the driver of the detected condition to generate a reduced urgency level; and
determining whether to issue an alert to the driver based on the reduced urgency level.

9. The one or more non-transitory computer-readable media of claim 8, wherein the program instructions, when executed by the one or more processors, cause the one or more processors to further perform the step of determining that the driver of the vehicle is looking in a direction of the detected condition at a time of the gesture.

10. The one or more non-transitory computer-readable media of claim 9, wherein the detected condition corresponds to an object, and wherein determining that the driver of the vehicle is looking in the direction of the detected condition comprises determining that the driver of the vehicle is looking in a direction of the object.

11. The one or more non-transitory computer-readable media of claim 9, wherein determining that the driver of the vehicle is looking in the direction of the detected condition is based on an eye vergence associated with the driver of the vehicle.

12. The one or more non-transitory computer-readable media of claim 8, wherein the gesture comprises at least one of a facial gesture, a body gesture, a manual input, a key thought, a haptic input signal, or a sharp exhale issued by the driver of the vehicle.

13. The one or more non-transitory computer-readable media of claim 8, wherein determining whether to issue the alert to the driver comprises:
determining whether the reduced urgency level exceeds a threshold level; and
if the reduced urgency level exceeds the threshold level, then generating the alert to issue to the driver, or
if the reduced urgency level does not exceed the threshold level, then refraining from generating the alert to issue to the driver.

14. A system, comprising:
one or more memories storing instructions; and
one or more processors coupled to the one or more memories and, when executing the instructions:
determine that a detected condition exceeds a threshold hazard potential;
detect a gesture, by a driver of a vehicle, associated with the detected condition;
in response to detecting the gesture, reduce an urgency level for alerting the driver of the detected condition to generate a reduced urgency level; and
determine whether to issue an alert to the driver based on the reduced urgency level.

15. The system of claim 14, wherein the one or more processors, when executing the instructions, further determine that the driver of the vehicle is looking in a direction of the detected condition at a time of the gesture.

16. The system of claim 14, wherein the gesture comprises at least one of a facial gesture, a body gesture, a manual input, a key thought, a haptic input signal, or a sharp exhale issued by the driver of the vehicle.

17. The system of claim 14, wherein determining whether to issue the alert to the driver comprises:
determining whether the reduced urgency level exceeds a threshold level; and
if the reduced urgency level exceeds the threshold level, then generating the alert to issue to the driver, or
if the reduced urgency level does not exceed the threshold level, then refraining from generating the alert to issue to the driver.

18. The system of claim 14, wherein detecting the gesture comprises:
receiving sensor data from one or more internal-facing sensors; and
detecting the gesture based on the sensor data.

19. The system of claim 14, further comprising:
receiving sensor data from one or more external-facing sensors; and
detecting the condition based on the sensor data.

20. The system of claim 14, further comprising one or more sensors, wherein the one or more processors, when executing the instructions, further:
detect, via the one or more sensors, a second system associated with the detected condition; and
transmit, to the second system, a message indicating that the driver has acknowledged the detected condition.

* * * * *